UNITED STATES PATENT OFFICE.

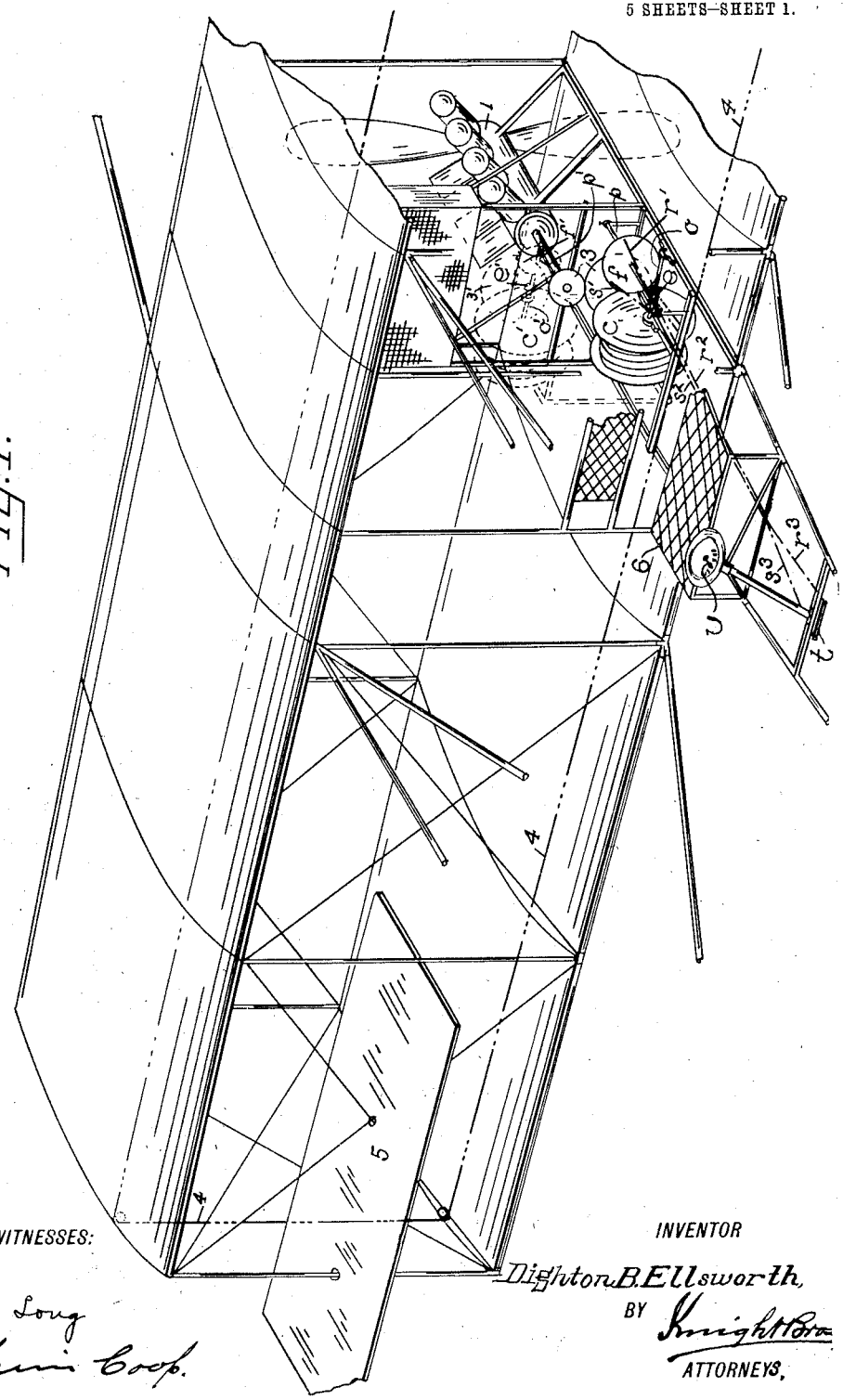

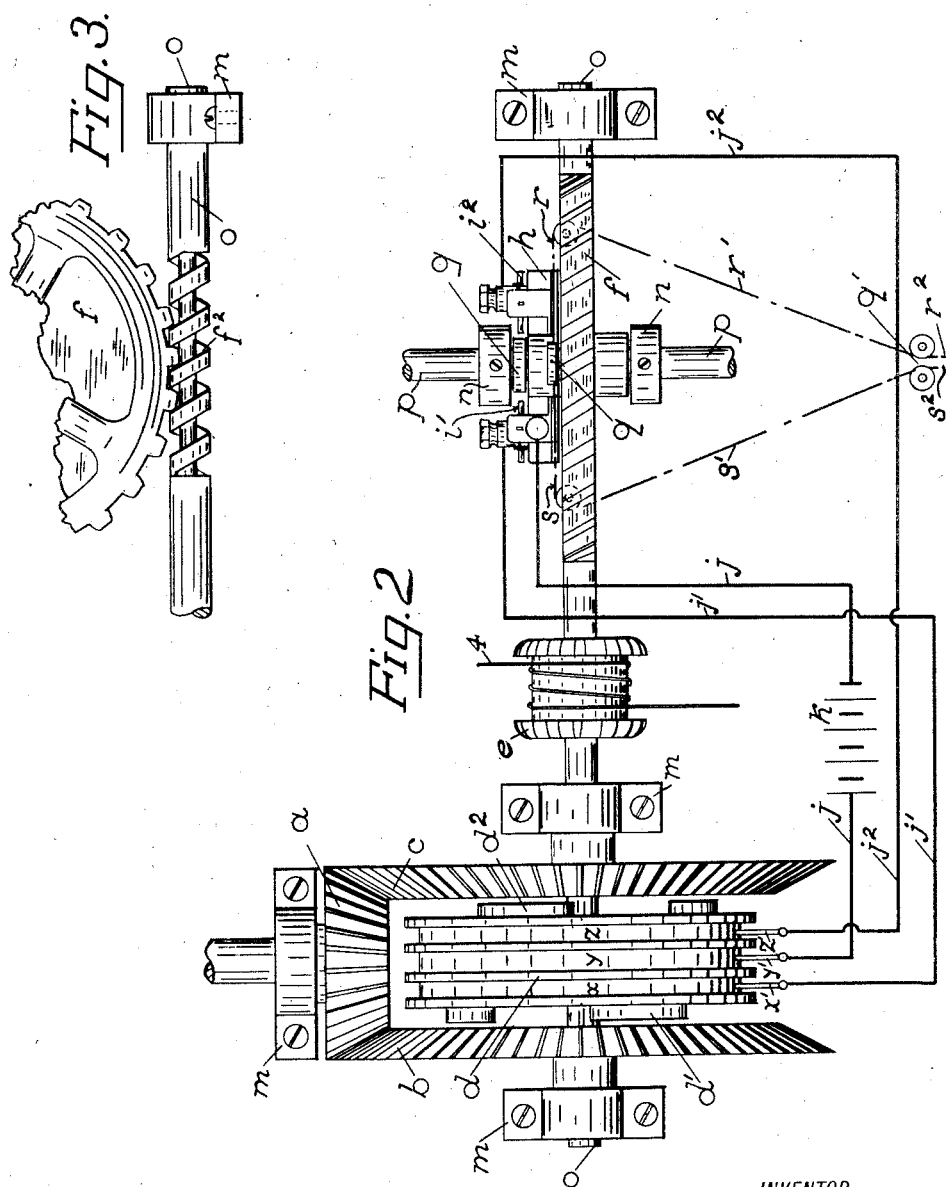

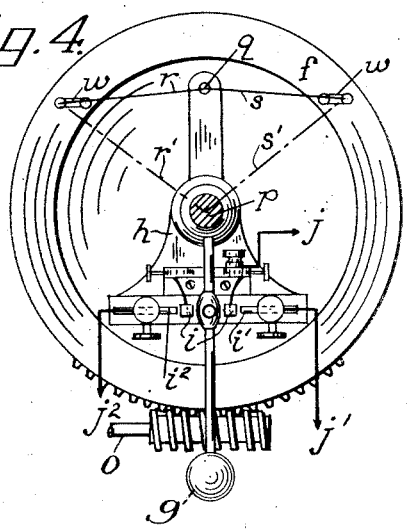
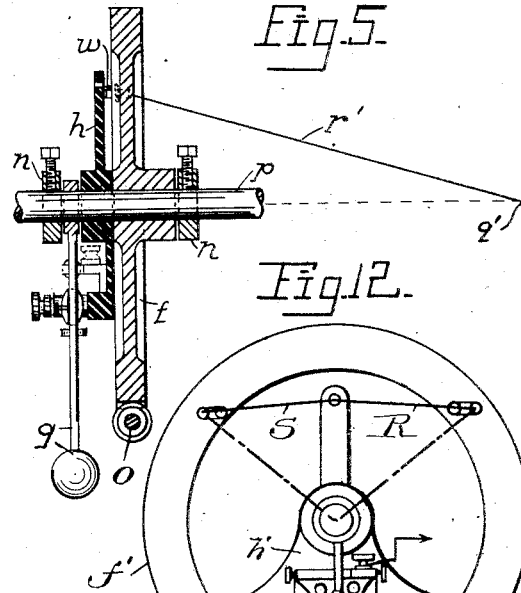
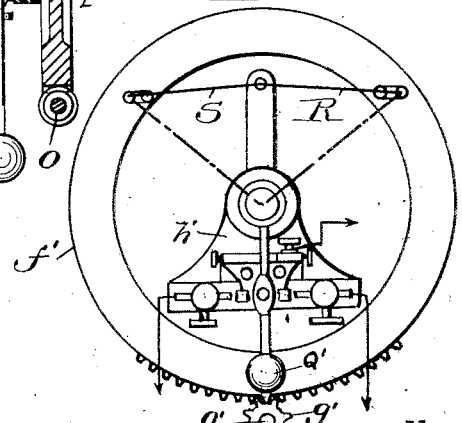
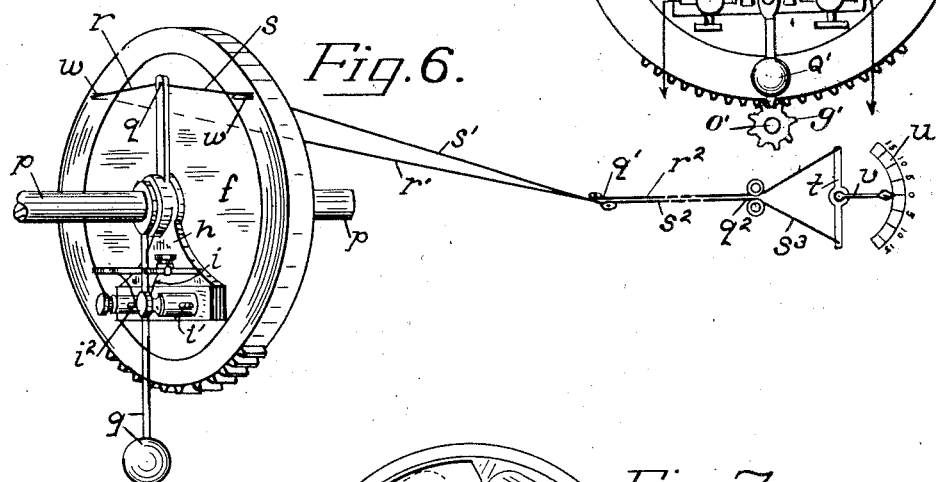
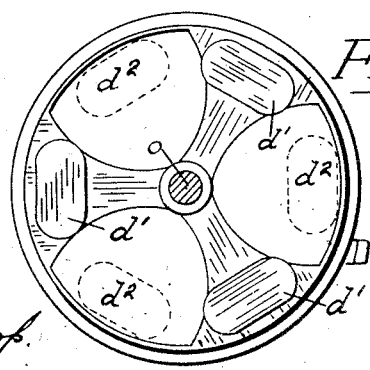

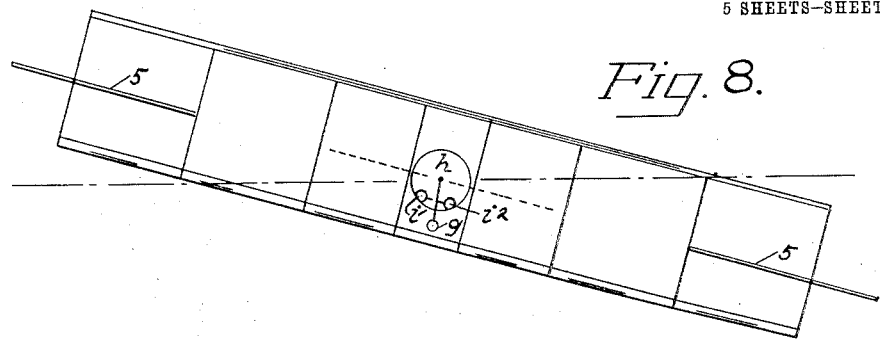
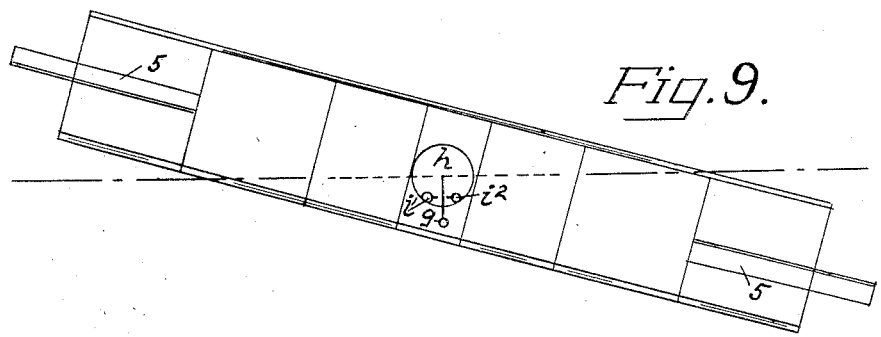
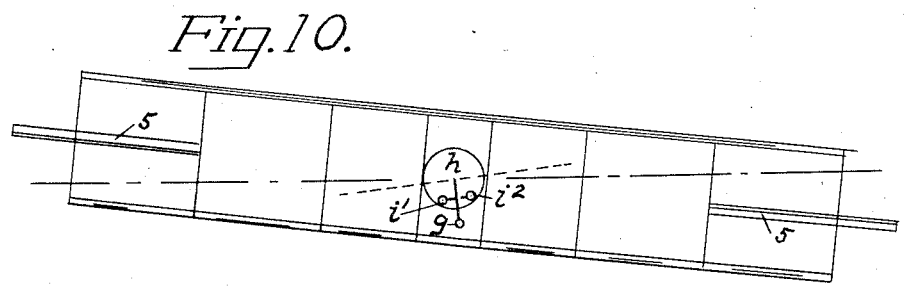
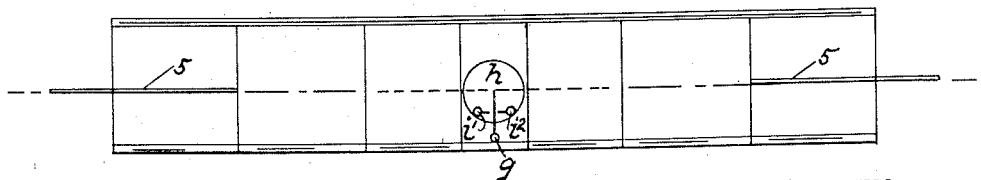

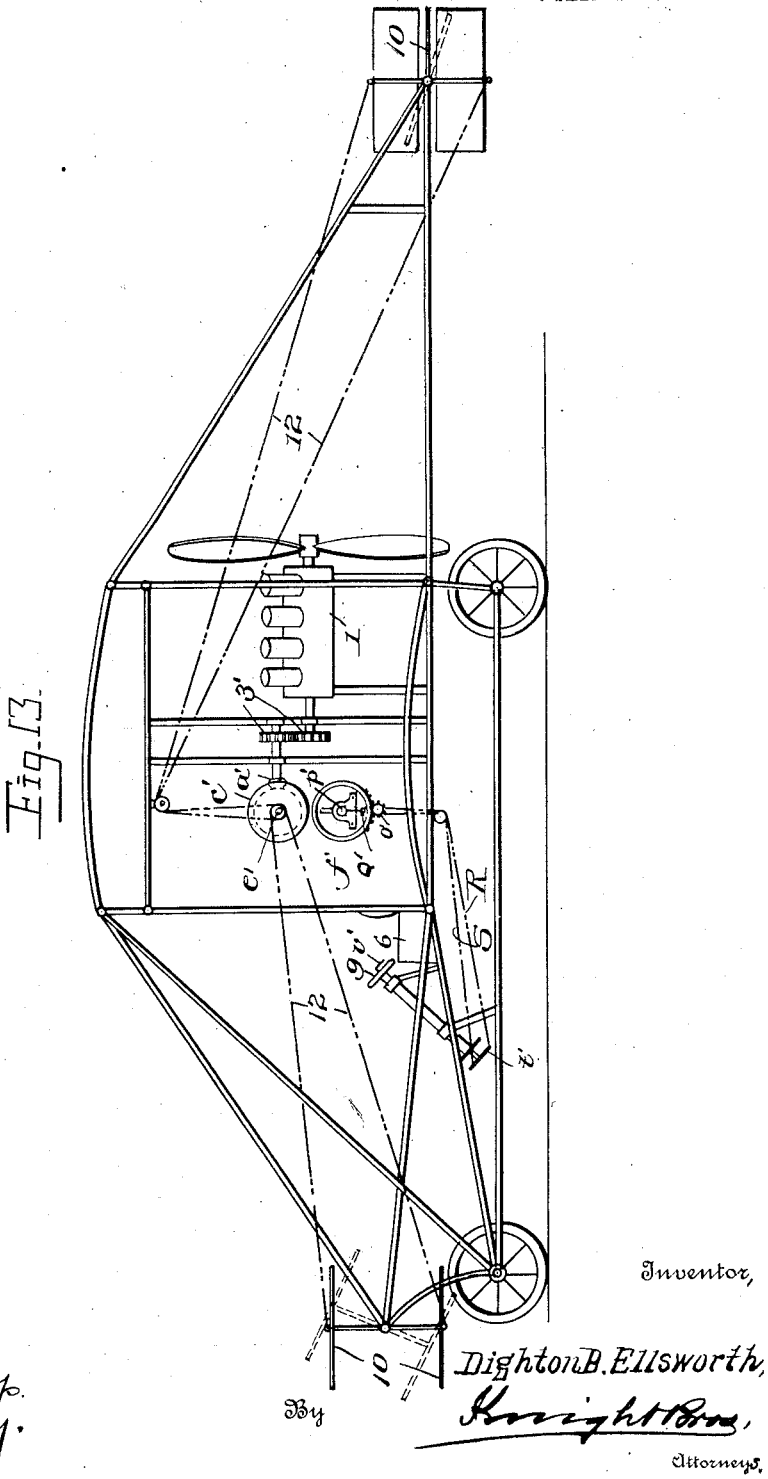

DIGHTON B. ELLSWORTH, OF PORTLAND, OREGON, ASSIGNOR OF ONE-THIRD TO C. E. HOUSTON AND ONE-THIRD TO H. L. LANE, OF PORTLAND, OREGON.

EQUILIBRATOR FOR AIRSHIPS.

1,024,398.  Specification of Letters Patent.  Patented Apr. 23, 1912.

Application filed December 13, 1910. Serial No. 597,099.

*To all whom it may concern:*

Be it known that I, DIGHTON B. ELLSWORTH, a citizen of the United States, and resident of Portland, county of Multnomah, and State of Oregon, have invented a new and useful Improvement in Equilibrators for Airships, of which the following is a specification.

This invention relates to a motor driven mechanism, so designed as to use electrical energy in combination with the force of gravity, to impart a reciprocating motion to automatically operate the balancing mechanism of an aeroplane, or other heavier-than air air craft, and my invention has for its object to obtain an automatic balancing mechanism of the type described.

It is also my object to obtain a device which will operate the balancing mechanism of an airship to the proper degree for correcting any angle of inclination from the horizontal, and to reduce this degree in direct proportion as the airship approaches the horizontal. And it is my further object to so arrange my device that the operator may control the airship without rendering my device inoperative, and that the operator may furthermore incline the airship at an angle from the horizontal and my device will maintain said angle.

In the accompanying drawings: Figure 1 is a partial front elevation and perspective of an aeroplane embodying my invention. Fig. 2 is a plan view of my device; Fig. 3 is a fragmental view of the worm gear; Figs. 4, 5 and 6 are views showing that part containing the make-and-break circuit system, and Fig. 7 is a side elevation of the magnet clutch wheel, showing the radial arrangement of the magnets on one side of said wheel, and showing in dotted lines the arrangement of the magnets on the opposite side; Figs. 8, 9, 10 and 11 are diagrammatic front elevations of an aeroplane, showing the ailerons at the tips of the wings, and only that part of my device which contains the make-and-break system, illustrating the action of my device while bringing the aeroplane from an inclination back to the horizontal. Fig. 12 is similar to Fig. 4 but illustrating another embodiment of the invention; and Fig. 13, a side elevation of an aeroplane showing particularly the second embodiment of the invention as applied to the fore and aft balancing mechanism.

The equilibrator (see Figs. 1 and 2) takes its power from the engine 1, of the aeroplane through a train of gears 3 terminating in a bevel pinion $a$, in mesh with two bevel wheels $b$ and $c$ for the lateral balance machine. For the longitudinal balance machine which is shown in dotted lines in Fig. 1 and also in Fig. 13 a similar train of gears $3'$, $a'$, $c'$ is provided.

In the balance machine shown in Fig. 2, the bevel pinion, $a$, drives in opposite directions a pair of bevel wheels $b$ and $c$, running loose on the shaft $o$, and between these oppositely rotating gears is situated a magnet wheel $d$, keyed to the shaft $o$ in such a manner as to rotate with the shaft and yet allow lateral movement of the magnet wheel upon the shaft. The bearings $m$ for the shaft $o$ are attached to the frame of the aeroplane. The magnet wheel $d$ (see also Fig. 7) has two sets of magnets $d'$ and $d^2$, facing, respectively, the two bevel gears $b$ and $c$, the latter acting as armatures to the respective magnets. The magnets are suitably connected to three collector rings $x$, $y$ and $z$, shown situated on the surface of the magnet wheel. The bevel gears or armatures will be hereinafter called, respectively, the right-hand armature, $c$ and the left-hand armature $b$, and it is understood that they constantly revolve in opposite directions. The magnet wheel $d$ and its armatures $b$ and $c$ form a reversible magnetic clutch.

On the shaft $o$ Figs. 1, 2 and 3 is situated a spool $e$, actuating the cords 4 (shown in dot-and-dash line in Fig. 1) which operate the ailerons 5, and beyond this spool, on said shaft $o$, is a worm $f^2$, shown in Fig. 3, driving a worm wheel $f$ on a shaft $p$ which latter is at right angles to the clutch shaft $o$. Upon said shaft $p$ (see Figs. 4, 5 and 6) are a block $h$ and a pendulum $g$ loosely attached and the block is adjustable relative to the worm wheel $f$, as hereinafter described, but may be rigidly attached to and rotatable with the worm wheel $f$ on the shaft $p$. This shaft is stationary and is provided with collars $n$, $n$ to prevent lateral movement of the devices on the shaft. The block $h$ is made of an electrical non-conductor, and has a series of terminals $i$, $i'$ and $i^2$, situated respectively in the center, on the right and on the left. The central terminal $i$ is connected through conductor $j$ to a battery or generator $k$ (see also Fig. 2) which is in turn connected to the brush $y'$ on the central collector ring $y$ of the magnet wheel $d$. This ring is connected to both series of magnets $d'$ and $d^2$, and the latter are respectively connected to the right and left hand collector rings $x$ and $z$, the right hand collector ring brush $z'$ being electrically connected through conductor $j^2$ to the right hand terminal $i^2$ on the block $h$, and the left hand collector ring brush $x'$ being electrically connected through conductor $j'$ to the left hand terminal $i'$ on the block $h$. It will now be seen that both the right and left hand magnet circuits are broken only at the contact block.

The pendulum $g$ is hung free on the block shaft $p$ in front of the block $h$. The central terminal $i$ terminates in two contact points, one on either side of the pendulum, while the left and right hand terminals $i'$ and $i^2$ are each one point and are arranged in such a manner that any relative movement between the block and the pendulum will cause the latter to close the circuit, allowing the current from the battery $k$ to energize either the right or left hand magnet, which will be attracted to its respective armature $b$ or $c$; which attraction will carry the wheel along the shaft $o$ into contact with the armature, and as the armature is constantly rotating, cause the wheel to be driven by and revolve with it; but as the magnet wheel $d$ is keyed to the shaft $o$, the latter will revolve also, turning the spool $e$, which inclines the ailerons 5. This shaft $o$ terminating in the worm $f^2$ of the worm wheel $f$, will cause said worm wheel to rotate on the block shaft $p$, carrying the block $h$ back to the horizontal, thus breaking the circuit, regardless of the inclination of the aeroplane as a whole. This prevents any further revolving of the magnet wheel $d$, and a consequent increase of the inclination of the ailerons over what is desirable before the aeroplane, as a whole, could be brought back to the horizontal; it being necessary to incline the ailerons only a slight degree for a slight inclination. Yet if greater inclination should be attained, greater movement of the ailerons must take place to counteract it. It is also necessary, as the machine approaches the horizontal, to decrease the angle of inclination of the ailerons.

Turning now to Figs. 8, 9, 10 and 11, which are diagrammatic front elevations of an aeroplane, showing the ailerons 5, 5 at the tips of the wings, and an enlarged view of the contact block $h$, pendulum $g$ and terminals $i'$ and $i^2$, the rest of the machine not being shown. These figures illustrate a series of positions representing the movement of an aeroplane from an inclination to the horizontal. In Fig. 8 the aeroplane is tipped at an angle to the horizontal, and the inclining of the block $h$ has allowed the pendulum $g$ to make the contact at the right hand terminal $i^2$. Comparing this view with Fig. 2, the closing of the circuit of the right hand terminal $i^2$ completes the circuit through conductor $j^2$ of the right hand magnet wheel $d^2$, which latter then is attracted to the right hand armature $c$, and revolves with it, turning the shaft $o$, and subsequently the spool $e$, the worm $f^2$ and the worm wheel $f$. In Fig. 9 the result of this action is shown, the ailerons 5 having been set to level the aeroplane, and the worm wheel and block $h$ brought back to the horizontal, the contact being broken.

It will be seen that only sufficient inclination of the ailerons is given for any degree of inclination of the aeroplane, as a slight inclination of the aeroplane would require only a partial revolution of the magnet wheel to break the circuit of the block, which partial revolution would set the ailerons at a slight angle; whereas a greater inclination of the aeroplane would require a greater number of revolutions of the magnet wheel to break the circuit at the block, which would incline the ailerons to a greater degree.

The action of the air upon the ailerons of the aeroplane, when arranged as shown in Fig. 9, tends to bring the aeroplane back to the horizontal, when a condition is met as illustrated in Fig. 10. The block $h$, which was horizontal in Fig. 9, is now tipped to the left, owing to the fact that the aeroplane previously inclined to the right is now more nearly horizontal, and contact is made with the left-hand terminal $i'$ which energizes the left-hand magnet circuit through conductor $j'$ attracting the magnet to the left hand armature $b$, which turns the magnet wheel $d$ in the opposite direction to its former rotation. This opposite rotation of the magnet wheel turns the shaft $o$ and spool $e$ in the opposite direction to that of their former rotation, bringing the ailerons 5, 5 back toward the horizontal, until the opposite rotation of the worm wheel and contact block has broken the circuit of conductor $j'$ and stopped the action. A further movement of the aeroplane toward the horizontal will repeat this action last described, until the aeroplane reaches the horizontal, as shown in Fig. 11, in which case the ailerons are in their normal and horizontal position, and the contact block $h$ is also brought back to the horizontal in its relation to the pendulum $g$ and the aeroplane. A movement of the aeroplane to the left would reverse the whole process just described, starting the movement caused by the closing of the left hand circuit through conductor $j'$ and returning with a series of slight movements caused by the closing of the right hand circuit of conductor $j^2$. If, during the return of the aeroplane to the horizontal, an outside force should incline it to a greater angle than formerly, the contact block $h$ carried with the aeroplane would close the circuit to set the ailerons at a greater angle. It is seen that at all times the machine has set the ailerons to their correct amount of inclination to give their proper efficiency at the particular angle at which the aeroplane is found. As this angle is changed by the action of the ailerons on the air, the machine constantly changes the amount of inclination of the ailerons to meet the new condition.

Heretofore the block $h$ has been considered as rigidly attached to the worm wheel $f$. The actual attachment is illustrated specifically in Fig. 6, and consists of a pair of cords $r$ and $s$, affixed to a point $q$, on the block $h$ and directly over the shaft $p$ and running through pulleys $w$, $w$, in the circumference of the worm wheel $f$. Passing from the pulleys these cords ($r'$ and $s'$) converge at a common point $q'$ on the line of the block shaft $p$. Passing from this point the cords ($r^2$ and $s^2$) extend to the base of the steering wheel, where (as $r^3$ and $s^3$) they separate from a common point $q^2$ and are attached to the arms of a lever $t$, whose fulcrum is at one end of a shaft, passing through the post to the steering wheel, the other end of this shaft terminating in an indicator arrow $v$, which registers on a curved scale $u$ on the wheel. These cords are of equal length, and when the indicator $v$ at the top of the steering wheel registers zero, the tips of the lever $t$ at the base of the steering wheel will be equi-distant from the separating point $q^2$, thus $r^3$ and $s^3$ will be equal. The cords $r^2$ and $s^2$ between the two points are constantly equal, being parallel; therefore, under this condition the cords $r^2$ plus $r^3$ and $s^2$ plus $s^3$ must be equal. Let us consider that the worm wheel $f$ is the base of a right cone, whose axis is the block shaft $p$, and whose apex is the common point $q'$. It is then evident that the cords $r'$ and $s'$ will lie on the face of this imaginary cone, and as the distance from the apex to the circumference of the base of a right cone is always the same (no matter in what position the cone is placed), these sections of the cord are constantly equal. It will then be seen that the cords $r$ and $s$ from the pulleys in the circumference of the wheel $f$ to the point $q$ on the block must be equal when the pulleys $w$, $w$ are symmetrically disposed as regards $g$ in which case the wheel may revolve on its shaft without changing the length of these cords $r$ and $s$, and as these cords remain constantly equal, the block $h$ carried by the cords $r$ and $s$ will revolve with the wheel $f$.

If the operator should desire to tip his aeroplane, he moves the indicator $v$ on the steering wheel to the right or left, thus changing the lengths of the cords $r^3$ and $s^3$ at the base of the steering wheel. As the cords $r^2$ and $s^2$ between the points $q^2$ and $q'$ are constantly equal, and as the cords $r'$ and $s'$ between the converging point $q'$ and the pulleys $w$ are constantly equal, this difference must be made up by the cords $r$ and $s$ between the pulleys $w$ and the point $q$ on the block $h$. If the operator moves his indicator $v$ so as to lengthen the distance $r^3$, between the right hand arm of the lever $t$ and the point $q^2$ the block $h$ will be moved to the right as the cord $r$ on this side will be shortened. This changes the relation of the block $h$ to the wheel $f$, at the same time throwing the block $h$ out of the horizontal, causing the pendulum $g$ to close the contact at $i^2$ on the right hand side, which starts the action described for inclining the ailerons; but the aeroplane is level, and the block is at an angle to the right of the horizontal, therefore at the end of action, when the block comes to rest at the horizontal, the aeroplane will be at an angle to the left of the horizontal and the equilibrator will hold the aeroplane at this angle, in the same manner that it normally holds it horizontally.

Upon the operator returning the indicator $v$ to zero, the action is reversed, and when the block $h$ comes to rest at the horizontal again, the aeroplane will also be horizontal.

The action of elevating rudders Fig. 13 is similar, longitudinally, to the lateral action of the ailerons. I realize that many forms of the device placed convenient to the seat 6 (shown in Fig. 1) may be arranged to operate the control cords $r$ and $s$.

In the lateral machine the worm wheel $f$, operated by the clutch shaft $o$, rides on the block shaft $p$, said shaft $p$ being at right angles to the clutch shaft $o$; but the wheel $f$ may be operated by a spiral or friction drive in which case the shaft $o$ would be parallel with shaft $p$. The same arrangement may also be used for the longitudinal balancing, the whole device then being mounted so as to allow the pendulum Q' to swing in the longitudinal plane of the air ship. In the longitudinal machine shown, Figs. 12 and 13 and in dotted lines in Fig. 1 the block shaft p' is paralled to the magnet wheel shaft o' and its accompanying wheel f' is operated by a spur gear. Any other suitable mechanical appliance, such as a chain or friction drive from the shaft o' might however be used. The elevating rudders are connected through cords 12 with the spool e'. Cords R and S attached to the contact block run over pulleys in wheel f' to either end of lever t' mounted on the same shaft as the indicator v' near the steering wheel in the same manner as has been described in connection with the lateral machine.

The operator may set his elevating indicator v' similarly to the lateral indicator at an angle, and the equilibrator will tip the elevating rudders, and, without his assistance, maintain this angle until he desires to change it.

In descending the elevating indicator is set to the desired angle, and the equilibrator will prevent the aeroplane from descending at a greater angle than desired, and upon approaching the earth, the operator may gradually reduce this angle, alighting with no danger of a violent impact.

The make-and-break device is similar on both machines and I realize that so many forms of electrical make-and-break devices, actuated by the force of gravity, may be arranged, that I do not deem it necessary to illustrate or describe any other than the simple form shown in Fig. 4, as the details are self suggestive to any skilled mechanic.

I claim:—

1. In an aeroplane propelled by a motor, the combination with a magnetic clutch comprising a shaft; a magnet wheel slidably keyed to said shaft and two oppositely rotating circular armatures, said armatures actuated by the propelling motor and running loose on said shaft; of a spool rigidly mounted on said clutch shaft, and means for balancing the aeroplane by connections to said spool; a block wheel rotatable on a stationary shaft parallel to the clutch shaft; means rotating the block wheel by the rotation of said clutch shaft; and a block and a pendulum independently rotatable on the stationary shaft.

2. In an aeroplane propelled by a motor, the combination with a magnetic clutch comprising a shaft; a magnet wheel slidably keyed to said shaft and two oppositely rotating circular armatures; said armatures actuated by the propelling motor and running loose on said shaft, of a spool rigidly mounted on said clutch shaft; and means for balancing the aeroplane by connections to said spool; a block wheel rotatable on a stationary shaft at right angles to the clutch shaft; means rotating the block wheel by the rotation of said clutch shaft; and a block and a pendulum independently rotatable on the stationary shaft.

3. In an aeroplane propelled by a motor, the combination with a magnetic clutch comprising a shaft; a magnet wheel slidably keyed to said shaft and two oppositely rotating circular armatures, normally running loose on said shaft, said magnet wheel consisting of two sets of magnets radially arranged on either side of the wheel and respectively connected with collector rings and a source of electric energy; of a spool; a block wheel rotatable on a stationary shaft; means rotating the block wheel by the rotation of said clutch shaft; a block rotatable on the stationary shaft and normally attached to said block wheel, electric terminals on said block, a circuit including said terminals, the electromagnets of said clutch and a source of electrical energy; and a pendulum rotatable on the stationary shaft mounted between said terminals and adapted to make or break the contact.

4. In an aeroplane propelled by a motor, the combination with a magnetic clutch comprising a shaft, a magnet wheel, slidably keyed to said shaft and two oppositely rotating circular armatures, said armatures actuated by the propelling motor and running loose on said shaft; of a spool rigidly mounted on said clutch shaft; movable wings connected to, and adjusted by means of said spool for balancing the aeroplane; a block wheel rotatable on a stationary shaft; means rotating the block wheel by rotation of said clutch shaft; a block rotatable on the stationary shaft and normally attached to said block wheel; electric terminals on said block, a circuit including said terminals, the electro-magnets of said clutch, a source of electrical energy; and a pendulum rotatable on the stationary shaft, mounted between said terminals and adapted to make or break the contact.

5. In an aeroplane propelled by a motor, the combination with a magnetic clutch and a shaft on which it is mounted, of a spool rigidly mounted on said clutch shaft; a block wheel rotatable on a stationary shaft; means rotating the block wheel by the rotation of said clutch shaft; a block rotatable on the stationary shaft; means for adjusting the relation of said block to the block wheel; electric terminals on said block; and a pendulum rotatable on the stationary shaft mounted between said terminals and adapted to make or break the contact.

6. In an aeroplane propelled by a motor, the combination with a magnetic clutch and a shaft on which it is mounted; of a spool rigidly mounted on said clutch shaft; a block wheel rotatable on a stationary shaft; means rotating the block wheel by the rotation of said clutch shaft; a block rotatable on the stationary shaft; means for adjusting the relation of said block to the block wheel, consisting of a lever on said block, cords running from said block lever through pulleys on the circumference of the block wheel to a common point in alinement with the block shaft, continuing through said point to connections within reach of the operator, electric terminals on said block; and a pendulum rotatable on the stationary shaft mounted between said terminals and adapted to make or break the contact.

7. In an aeroplane propelled by a motor, the combination with a magnetic clutch and a shaft on which it is mounted, of a spool rigidly mounted on said clutch shaft; a block wheel rotatable on a stationary shaft; means rotating the block wheel by the rotation of said clutch shaft; a block rotatable on the stationary shaft; means for rotating said block by the rotation of the block wheel; means for adjusting the relative positions of said block and said block wheel, consisting of a lever on said block, cords running from said block lever through pulleys on the circumference of the block wheel to a common point in alinement with the block shaft, continuing through said point to connections within reach of the operator; electric terminals in two sets on said block, a circuit including said terminals, the electro-magnets of said clutch and a source of electrical energy; and a pendulum rotatable on the stationary shaft mounted between said sets of terminals and adapted to make contact with either of said contact points, or to break the contact.

8. In an aeroplane propelled by a motor, the combination with a magnetic clutch and a shaft on which it is mounted; of a spool rigidly mounted on said clutch shaft; a block wheel rotatable on a stationary shaft; means rotating the block wheel by the rotation of said clutch shaft; a block rotatable on the stationary shaft; electric terminals in two sets on said block, and a pendulum rotatable on the stationary shaft mounted between said sets of terminals so that movement of the block in relation to the pendulum would connect one set of terminals.

9. In an aeroplane propelled by a motor, the combination with a magnetic clutch and a shaft on which it is mounted, of a spool rigidly mounted on said clutch shaft; a block wheel rotatable on a stationary shaft; means rotating the block wheel by the rotation of said clutch shaft; a block rotatable on the stationary shaft, electric terminals in two sets on said block; and means for connecting either set of terminals by the force of gravity working on a movable switch.

10. In an aeroplane propelled by a motor, the combination with a pair of magnetic clutches, each clutch comprising a shaft, a magnet wheel slidably keyed to said shaft and two operatively rotating circular armatures, said armatures actuated by the propelling motor and normally running loose on said shaft; of a spool rigidly mounted on each of said clutch shafts and means for balancing the aeroplane transversely and longitudinally respectively by connections to said rotatable spools, a rotatable block wheel on each of two stationary shafts; means rotating the block wheels by the rotation of said clutch shafts respectively; and a block and pendulum for making or breaking contacts independently rotatable on each of the stationary shafts.

11. In an aeroplane propelled by a motor, the combination with a pair of magnetic clutches, each clutch comprising a shaft, a magnet wheel slidably keyed to said shaft and two oppositely rotating circular armatures actuated by the propelling motor and normally running loose on said shaft; of a spool rigidly mounted on each of said clutch shafts; a set of movable wings respectively connected by means of cords to each of said spools and adjusted by the spools for balancing the aeroplane transversely and longitudinally respectively; a rotatable block wheel on each of two stationary shafts; means rotating the block wheel by the rotation of said clutch shafts respectively; a rotatable block on each of the stationary shafts and normally attached to each of said block wheels; electric terminals on said blocks, a circuit including said terminals, the electromagnets of said clutches, and source of electrical energy; and a pendulum for making and breaking contacts loosely mounted on each of the stationary shafts, hung between said terminals.

12. In an aeroplane propelled by a motor, the combination with a pair of magnetic clutches, each clutch comprising a shaft, a magnet wheel slidably keyed to said shaft and two oppositely rotating circular armatures, said magnet wheel consisting of two sets of magnets radially arranged on either side of the wheel and respectively connected with collector rings and a source of electric energy, of a spool rigidly mounted on each of said clutch shafts; and means for balancing the aeroplane transversely and longitudinally respectively by connections to said rotatable spools; a rotatable block wheel on each of two stationary shafts; means rotating the block wheels by the rotation of said clutch shafts respectively; and a block and pendulum for making or breaking contacts independently rotatable on each of the stationary shafts.

13. In an aeroplane propelled by a motor, the combination with a pair of magnetic clutches each clutch comprising a shaft, a magnet wheel slidably keyed to said shaft and two oppositely rotating circular armatures, said magnet wheel consisting of two sets of magnets radially arranged on either side of the wheel and respectively connected with collector rings; of a spool rigidly mounted on each of said clutch shafts, and means for balancing the aeroplane transversely and longitudinally respectively by connections to said rotatable spools; a rotatable block wheel on each of two stationary shafts; means rotating the block wheels by the rotation of said clutch shafts respectively; a block rotatable on each of the stationary shafts; electric terminals in two sets on each of said blocks, and means for connecting either set of terminals by the force of gravity working on a movable conductor.

14. In an aeroplane propelled by a motor, the combination with a pair of magnetic clutches, each clutch having a shaft on which it is mounted, each shaft having a spool, of a rotatable block wheel on each of two stationary shafts; means rotating the block wheels by the rotation of said clutch shafts respectively, a rotatable block on each of the stationary shafts, and normally attached to each of said block wheels; electric terminals on said blocks, circuits including said terminals, the electro-magnets of said clutches and a source of electrical energy; and a pendulum rotatable on the stationary shafts mounted between said terminals.

15. In an aeroplane propelled by a motor, the combination with a pair of magnetic clutches, each clutch having a shaft on which it is mounted, each shaft having a spool rigidly mounted thereon; of a rotatable block wheel on each of two stationary shafts; means rotating the block wheels by the rotation of said clutch shafts, a block rotatable on each of the stationary shafts; and normally attached to said block wheel; means for adjusting the relative positions of said blocks and said block wheels, consisting of a lever on each block, cords running from said block levers through pulleys on the circumference of the block wheels to common points in alinement with the block shafts respectively, continuing through said points to connections within reach of the operator; electric terminals in two sets on each of said blocks, circuits including said terminals, the electromagnets of said clutches and a source of electrical energy; and a pendulum rotatable on each of said stationary shafts mounted between said sets of terminals, so that movement of each block in relation to its pendulum would connect one set of terminals.

16. In an aeroplane propelled by a motor, the combination with a pair of magnetic clutches, each having a shaft on which it is mounted; each clutch comprising a magnet wheel and two oppositely rotating circular armatures, said armatures actuated by the propelling motor; each of said magnet wheels consisting of two sets of magnets radially arranged on either side of the wheel and respectively connected with collector rings and a source of electric energy; of a spool mounted on each of said clutch shafts and rotatable therewith; and means for balancing the aeroplane by connections to said rotatable spools; a pair of block wheels each rotatable on a stationary shaft; means rotating each block wheel by the rotation of its respective clutch shaft; a block rotatable on each stationary shaft; means for rotating each block by the rotation of its respective block wheel; means for adjusting the relative position of each block and block wheel, consisting of a lever on each block, cords running from said block levers through pulleys on the circumference of the block wheels to a common point in alinement with the block shafts respectively, continuing through said points to connections within reach of the operator; electric terminals in two sets on each of said blocks circuits including said terminals, the electromagnets of said respective clutches and said source of electrical energy; and a rotatable pendulum on each stationary shaft mounted between said sets of terminals, so that movement of each block in relation to its pendulum would connect one set of terminals.

17. In an aeroplane propelled by a motor, the combination with a pair of magnetic clutches, each clutch having a shaft on which it is mounted, each clutch comprising a magnet wheel and two oppositely rotating circular armatures, said armatures actuated by the propelling motor, each of said magnet wheels consisting of two sets of magnets radially arranged on either side of the wheel and respectively connected with collector rings and a source of electric energy, of a spool mounted on each of said clutch shafts and rotatable therewith; and means for balancing the aeroplane by connections to said rotatable spools; a pair of block wheels each rotatable on a stationary shaft; means rotating each block wheel by the rotation of its respective clutch shaft; a block rotatable on each stationary shaft; means for rotating each block by the rotation of its respective block wheel, means for adjusting the relative position of each block and block wheel, consisting of a lever on each block, cords running from said block levers through pulleys on the circumference of the block wheels to a common point in alinement with the block shafts respectively, continuing through said points to connections within reach of the operator; electric terminals in two sets on each block, circuits including said terminals, the electro-magnets of said respective clutches and said source of electrical energy; and means for connecting either set of terminals on each block by one movable conductor for each block influenced by the force of gravity.

DIGHTON B. ELLSWORTH.

Witnesses:
    MILDRED S. POWERS,
    ROSCOE C. NELSON.